US00RE43447E

(19) United States
(12) Reissued Patent
Lee et al.

(10) Patent Number: US RE43,447 E
(45) Date of Reissued Patent: Jun. 5, 2012

(54) METHOD OF APPLICATION MENU SELECTION AND ACTIVATION USING IMAGE COGNITION

(75) Inventors: Jin Soo Lee, Seoul (KR); Hyeon-June Kim, Seoul (KR)

(73) Assignee: LG Electronics Inc., Seoul (KR)

(21) Appl. No.: 13/048,945

(22) Filed: Mar. 16, 2011

Related U.S. Patent Documents

Reissue of:
(64) Patent No.: 6,160,899
Issued: Dec. 12, 2000
Appl. No.: 09/119,636
Filed: Jul. 21, 1998

(30) Foreign Application Priority Data

Jul. 22, 1997 (KR) ..... 97/34165

(51) Int. Cl.
*G06K 9/00* (2006.01)
(52) U.S. Cl. ..... 382/103; 382/100; 348/77; 715/863
(58) Field of Classification Search ..... 382/103; 348/14.05, 77, 114, 115, 169, 211.1, 211.2, 348/211.4; 725/19, 59
See application file for complete search history.

(56) References Cited

U.S. PATENT DOCUMENTS 4,565,999 A * 1/1986 King et al. ..... 345/158
5,252,951 A * 10/1993 Tannenbaum et al. ..... 345/156
5,319,747 A 6/1994 Gerrissen et al.
5,454,043 A 9/1995 Freeman
5,511,148 A * 4/1996 Wellner ..... 358/1.6
5,528,263 A 6/1996 Platzker et al.
5,553,277 A 9/1996 Hirano et al.
5,617,312 A * 4/1997 Iura et al. ..... 700/83
5,732,227 A * 3/1998 Kuzunuki et al. ..... 715/775
5,802,220 A * 9/1998 Black et al. ..... 382/276
5,898,434 A * 4/1999 Small et al. ..... 715/810
5,900,863 A * 5/1999 Numazaki ..... 345/158
5,926,168 A * 7/1999 Fan ..... 345/158
5,926,264 A * 7/1999 Beale et al. ..... 356/152.1
6,094,197 A * 7/2000 Buxton et al. ..... 715/863
6,525,749 B1 * 2/2003 Moran et al. ..... 715/863

FOREIGN PATENT DOCUMENTS

JP 05-324181 12/1993

OTHER PUBLICATIONS

Office Action issued in U.S. Appl. No. 13/027,619 dated Jul. 1, 2011.

(Continued)

*Primary Examiner* — Jason M Repko
*Assistant Examiner* — Shervin Nakhjavan
(74) *Attorney, Agent, or Firm* — KED & Associates LLP

(57) ABSTRACT

A method for selecting and activating a particular menu displayed in a client's region of a monitor screen by use of an image cognition is disclosed. Using an image-capturing device such as a camera attached to a system, a user's image is recognized at real time and displayed on an initial screen of a monitor. The user makes a direct hand motion while viewing his own image displayed on the initial screen, and when a desired menu icon is designated among a variety of menu icons arrayed on the initial screen, the system guides the user's hand image to the corresponding menu icon for its selection. When the user makes a particular body motion to activate the selected menu, the system recognizes the motion for thereby activating the selected menu.

5 Claims, 5 Drawing Sheets

OTHER PUBLICATIONS

Korean Office Action dated Sep. 22, 1999. (Application No. 10-1997-0034165).

Notice of Allowance issued in U.S. Appl. No. 13/027,619 dated Dec. 13, 2011.

* cited by examiner

METHOD OF APPLICATION MENU SELECTION AND ACTIVATION USING IMAGE COGNITION

Matter enclosed in heavy brackets [ ] appears in the original patent but forms no part of this reissue specification; matter printed in italics indicates the additions made by reissue.

*This application is a Reissue of U.S. Pat. No. 6,160,899. More than one reissue application has been filed for the reissue of U.S. Pat. No. 6,160,899. The Reissue application numbers are Ser. Nos. 13/027,619 and 13/048,945 (the present application).*

BACKGROUND OF THE INVENTION

1. Field of the Invention

The present invention relates to a method of selecting and activating an application menu, and more particularly, to an improved method of application menu selection and activation through image cognition, wherein a menu is selected and activated in correspondence to a user's motion while the motion image of the user is recognized at real time by an image-capturing device such as a camera.

2. Description of the Background Art

In order to select and activate a particular item from a list of application menu being displayed on a monitor screen, a computer generally adopts an input device, such as keyboard, mouse and touchpad.

Under a touch-screen method, the moment a user touches directly by hand a desired menu item among the menu list displayed on the monitor screen, the menu item becomes activated.

As another example, a pointer type wireless control device is employed to select and activate a menu list using an infrared transmission device. Such a pointer type wireless control device is provided with a plurality of sensors at corner portions of a monitor and it calculates a phase difference using an infrared signal being generated from a transmission unit, and accordingly coordinate values are obtained so that a transmitter may move the pointer to a desired position, thereby selecting and activating the required menu item.

However, such a conventional technology requires an additional, external device for the menu selection and activation.

Further, in case of a touch-screen and a pointer type wireless control device, there should be disadvantageously provided a plurality of sensors at corner portions of the monitor.

SUMMARY OF THE INVENTION

The present invention is directed to solving the conventional disadvantages.

Accordingly, it is an object of the present invention to provide a method of application menu selection and activation using image cognition which is capable of selecting and activating a menu list in response to a user's motion or a particular device movement while recognizing a user's image at real time by use of an image-capturing device such as a camera.

According to an embodiment of the present invention, using an image-capturing device such as a camera attached to a system, a user's image is recognized at real time and displayed on an initial screen of a monitor. The user makes a direct hand motion while viewing his own image displayed on the initial screen, and when a desired menu icon is designated among a variety of menu icons arrayed on the initial screen, the system guides the user's hand image to the corresponding menu icon for its selection. When the user makes a particular body motion to activate the selected menu, the system recognizes the motion for thereby activating the selected menu.

In the above-described embodiment, a pattern wearable on a finger may be employed so as to accurately recognize a user's specific motion. When the user indicates a desired menu icon wearing the pattern on his finger, the system guides the user's hand image on the screen to move toward the corresponding menu icon for the menu selection. As described in the above-described embodiment, when the user makes a particular body motion to activate the selected menu, the system recognizes the motion for thereby activating the selected menu.

According to another embodiment of the present invention, a particular pattern grabbable by a user is employed. When the user indicates a desired menu icon, the system guides the user's hand image displayed on the screen to move to the corresponding menu icon for its selection, and when the user operates a menu activating member provided in the pattern itself, the system responds, whereby the selected menu becomes activated.

The object and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
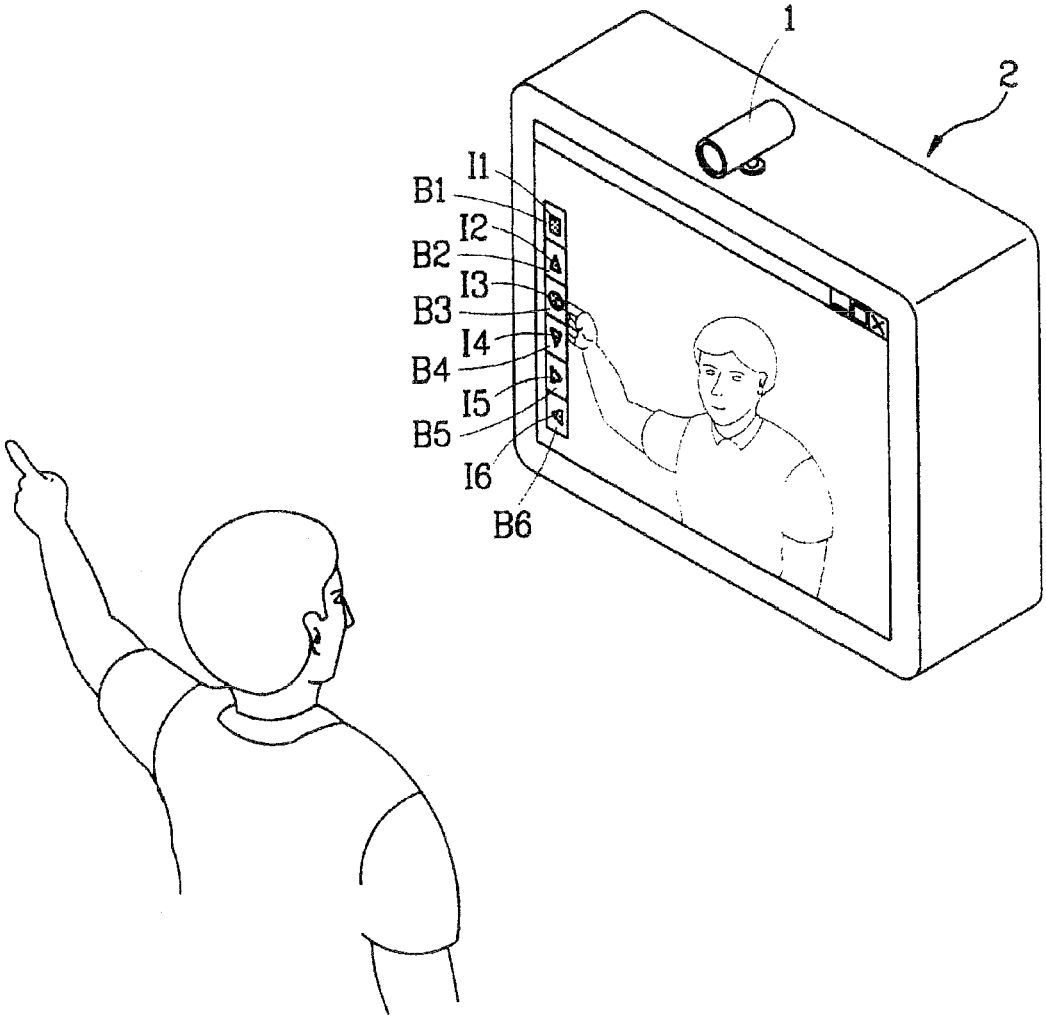
FIG. 1 is a schematic view for realizing an image cognition system according to the present invention.

FIG. 1 is a schematic view illustrating an apparatus for realizing the present invention. As shown therein, the apparatus according to the present invention includes a camera 1 for capturing a user's image, and a system 2, such as a personal computer and an HDTV set, for digital-processing the images captured by the camera 1.

On the initial screen serving as a client's window region, there are displayed a plurality of menu lists in type form of icons 11, 12, 13, . . . , 16. A user's image is displayed on the entire initial screen together with the menu lists.

The menu icons 11, 12, 13, . . . , 16 are displayed on the left of the screen, and the dotted squares B1, B2, B3, . . . , B6 enclosing the icons 11, 12, 13, . . . , 16, respectively, are pattern regions for pattern cognition and they do not appear on the real screen.

Figure 2:
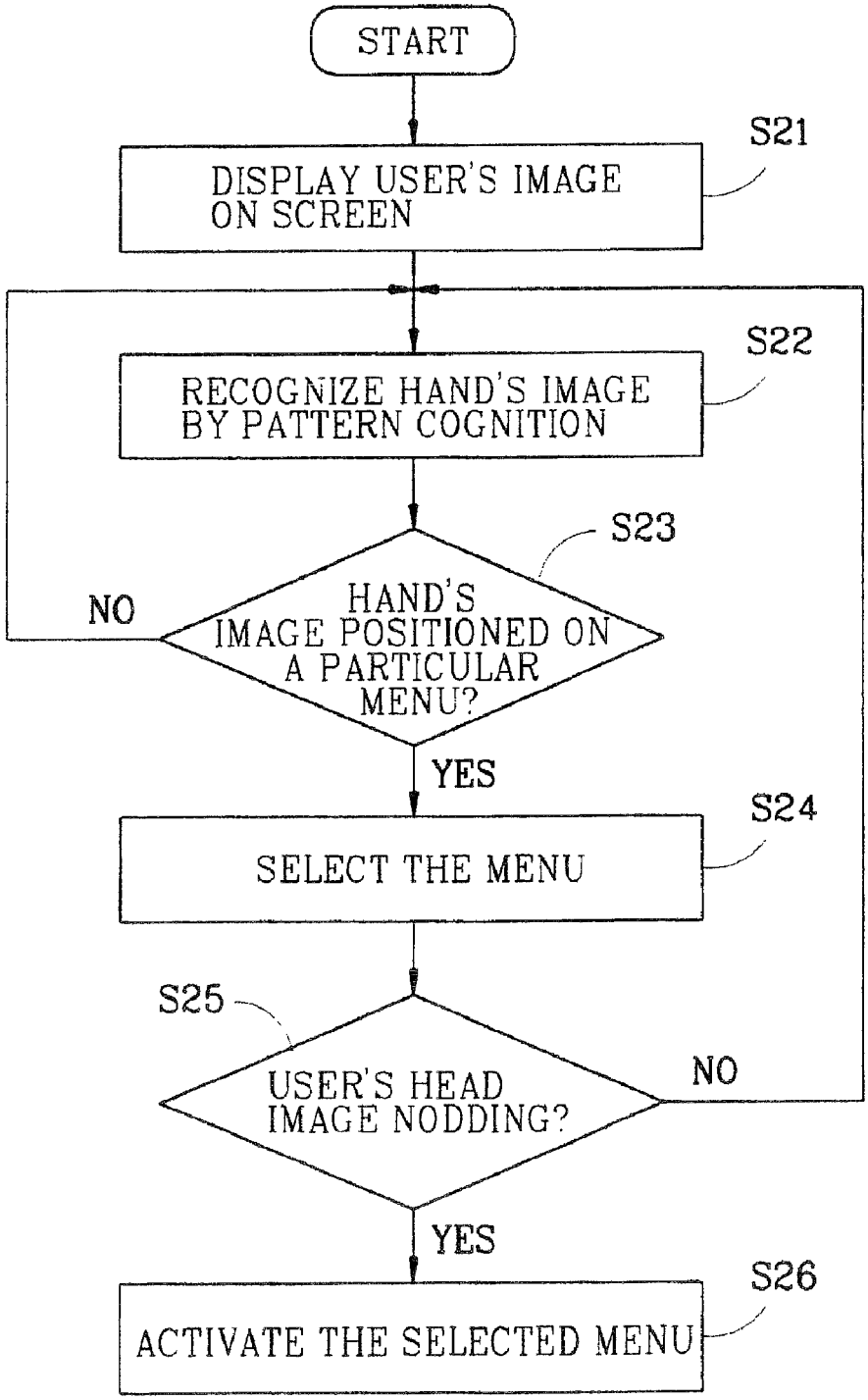
FIG. 2 is a flow chart illustrating steps for selecting and activating an application menu using an image cognition according to a first embodiment of the present invention.

FIG. 2 is a flow chart illustrating steps for selecting and activating an application menu using an image cognition according to a first embodiment of the present invention.

When the system 2 starts operation, the user's image captured by the camera 1 is displayed on the monitor screen. Accordingly, the user can view his own image being displayed on the screen as shown in FIG. 1 (Step S21).

Likewise, as the user's own image is displayed on the screen, the user can easily notice his hand's location while feeling he stands in front of a mirror.

Then, following the hand's movement of the user, a menu icon will be selected and the selected menu icon will be activated and the relevant steps will now be described.

When the user moves his hand toward the region of menu icons 11, 12, 13, . . . , 16, the user's hand image on the screen also moves toward the menu icons.

In the meantime, the system 2 continuously checks up the screen color within the plurality of patterns regions B1, B2, B3, . . . , B6 (Step S22). Since the user's hand is flesh color and the screen background color is not so, when the user moves his hand to a certain pattern region B2, the color in the pattern region B2 changes to flesh color. The system 2 checks up whether the screen color within the pattern regions B1, B2, B3, . . . , B6 is converted to flesh color, thereby determining that the user's hand is positioned on a particular menu icon (Step S23).

In FIG. 1, the user's hand is positioned in the second pattern region B2. Likewise, when the user's hand moves into the particular pattern region B2 selected from the plurality of pattern regions B1, B2, B3, . . . , B6, the system 2 recognizes that the pattern region B2 has been selected by the user to thereby convert the color of the menu icon 12. Accordingly, the user recognizes that the menu icon 12 being indicated by himself has been selected (Step S24).

In the next step, if the user nods his head, the system 2 recognizes the nodding through a gesture cognition device provided within the system 2 and accordingly activates the selected menu icon 12 (Steps S25, S26).

Meanwhile, in order for the system to recognize the user's gesture, there should be provided a pattern cognition using a moving image. That is, the system continuously captures the user's image and the captured moving image is preprocessed, and the previously captured image is compared with the presently captured image so as to extract characteristics of the two images, whereby the nodding of the user's head can be determined on the ground of the extracted characteristics.

The method in the above-described embodiment is to activate menu by recognizing the user's gesture. Here, the menu activation can be also performed when a particular pattern stays within a certain pattern region for a certain time period. Here, by adding a function to the system, the stationed time period of the particular pattern may be counted so that if a predetermined time lapses the menu becomes activated.

In the selection mode of the menu using the hand motion recognition of the user, there may occur an error operation in the result of erroneous recognition in which a hand motion of the user is mistaken for an arm motion due to the inaccurate recognition of the system. In order to overcome such an erroneous operation of the system, a simple type of pattern can be worn on a user's finger.

Figure 4A:
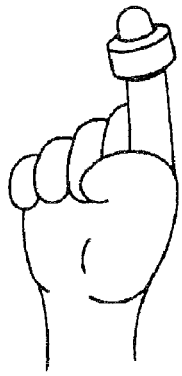
FIG. 4A is a view illustrating a ring-type pattern applicable to the first embodiment of the present invention.

As shown in FIG. 4A, a ring type pattern is provided to be worn on a user's finger. Accordingly, the user's hand with the ring type pattern worn on the finger enables the system to accurately select a desired menu item displayed on the initial screen without error, in response to the pattern motion.

Figure 4B:
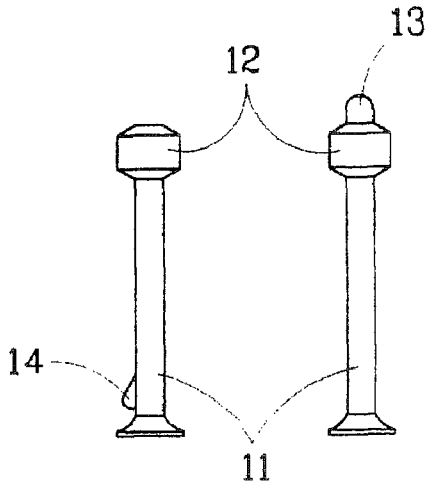
FIG. 4B is a view illustrating a rod-type pattern applicable to the second embodiment of the present invention.

As further shown in FIG. 4B, the second embodiment of the present invention allows the user to grab the rod type pattern, and the user selects a desired menu item and activates the selected menu item by driving a menu activating member provided in the rod type pattern.

The indication rod as shown in FIG. 4B includes a body 11 grabbable by the user, a first pattern portion 12 formed on an end of the body 11, a second pattern portion 13 disposed at an outer end of the first pattern portion 12 and guidable through the first pattern portion 12, and a button 14 for guiding the second pattern portion 13 into and out of the first pattern portion 12. Here, the indication rod illustrated on the left in FIG. 4B denotes a state before the button 14 is pressed, and that on the right denotes a state at which the second pattern portion 13 is exposed from the first pattern portion 12 in correspondence to the pressing of the button 14.

Figure 3:
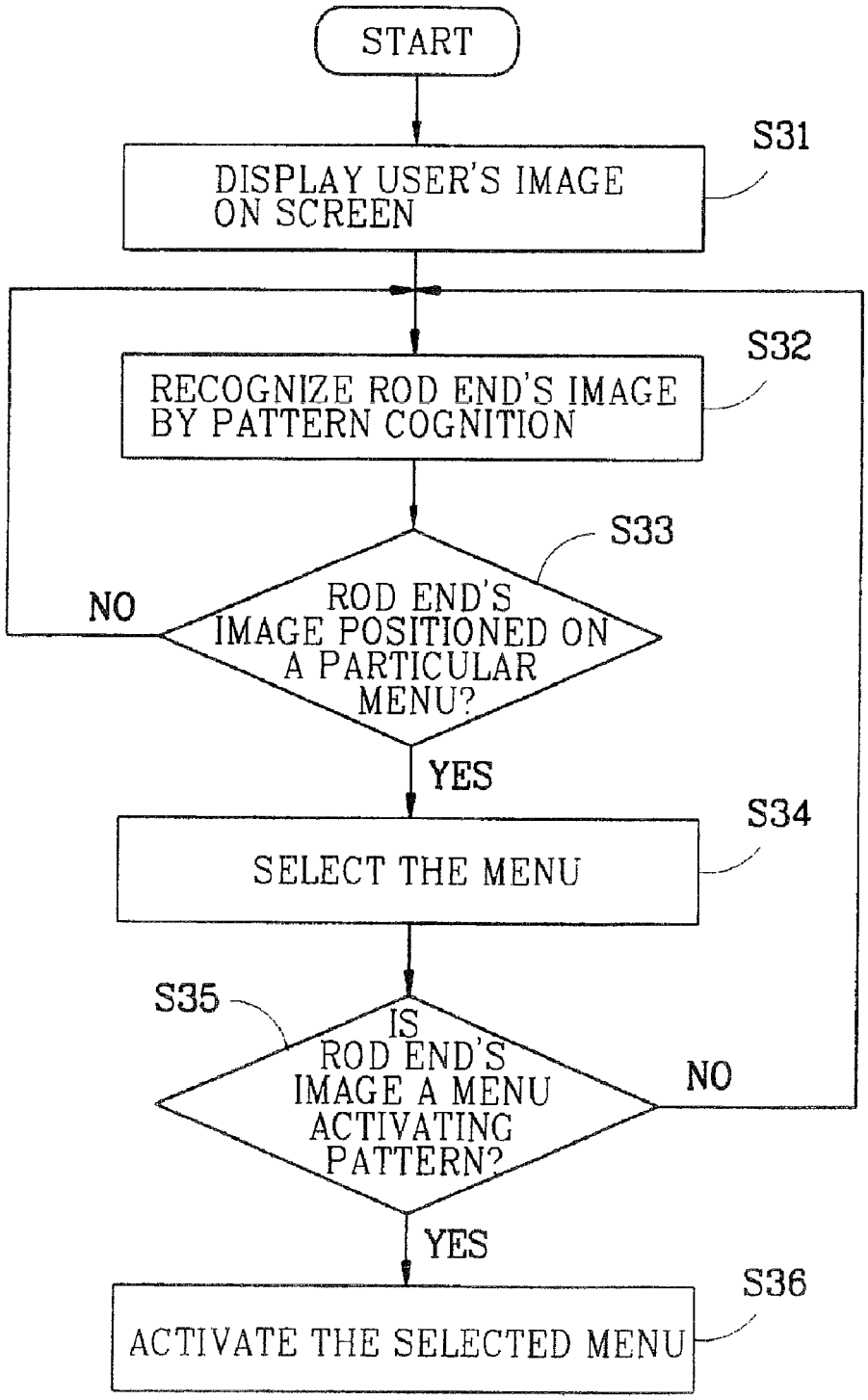
FIG. 3 is a flow chart illustrating steps for selecting and activating an application menu using an image cognition according to a second embodiment of the present invention.

With reference to FIGS. 1 and 3, the application menu selection method using image cognition together with the indication rod will now be described.

First, the data with regard to the first pattern portion 12 and the second pattern portion 13 are set in the system.

Step S31 is identical to Step S21 in FIG. 2. In Step S32, the user moves the indication rod while viewing his own image displayed on the monitor screen, so that the first pattern portion 12 at the end of the indication rod can reach toward the pattern region B2 on the left side of the screen. At this time, the system checks up the color within the plurality of pattern regions B1, B2, B3, . . . , B6 (Step S32). Since the data responding to the first pattern portion 12 are already stored in the system, it can be determined whether the background color within the pattern regions B1, B2, B3, . . . , B6 is converted to a color corresponding to the first pattern portion 12 (Step S33). In case the first pattern portion 12 of the indication rod is moved into the pattern region B2, the system recognizes the first pattern portion 12 and converts color of the menu icon 12, whereby the user recognizes that a desired menu item is selected.

Next, when the button 14 of the indication rod is pressed by the user, the second pattern portion 13 is externally exposed from the first pattern portion 12. When the exposure of the second pattern portion 13 is detected by the system, the selected menu icon 12 becomes activated. Likewise, if there is employed such an indication rod having the first and second pattern portions, the system does not require such a gesture cognition function as described in the first embodiment of the present invention.

Figure 5:
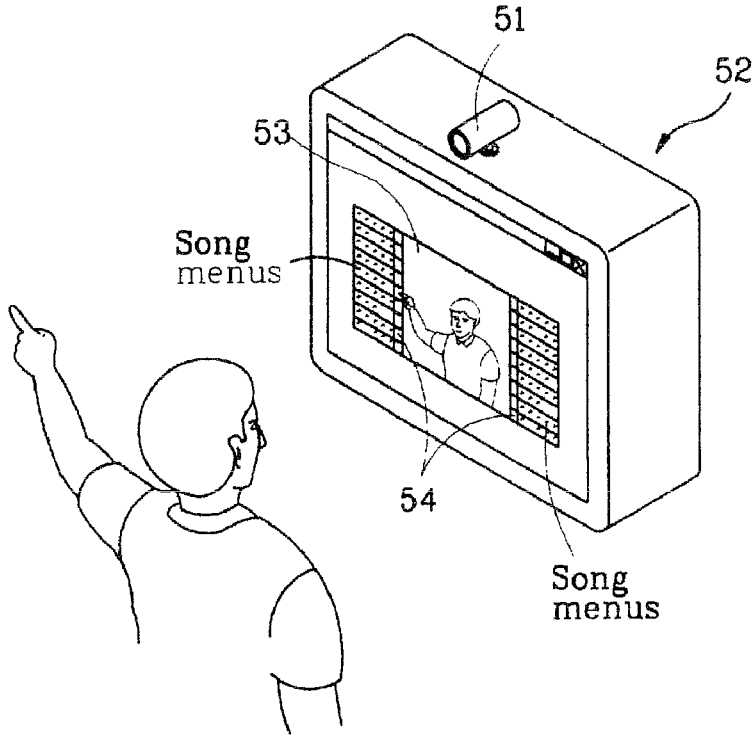
FIG. 5 is a schematic view for illustrating a user's image together with a plurality of menu lists displayed on a system monitor, wherein the user's image is positioned on the central portion of the monitor screen.
Figure 6:
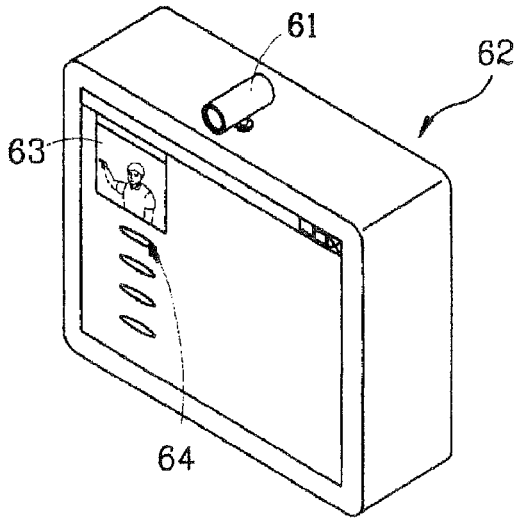
FIG. 6 is a schematic view for illustrating a user's image together with a plurality of menu lists displayed on a system monitor, wherein the user's image is positioned on a corner portion of the monitor screen.

In FIGS. 5 and 6, the user's image and a menu composition are displayed on the monitor screen of the systems 52, 62, which are easily applicable to electronic devices, for example, employed in karaoke.

As shown in FIG. 5, a predetermined size of image block 53 arrayed on the central portion of the entire screen is set to display the user's image, and a plurality of menus with song titles are displayed on each side of the image block 53. A pattern region 54 is set at inner ends of the song titled portions approaching the image block 53.

When the user moves his hand leftward to select a menu, the system 52 recognizes the leftward motion so that the hand in the user's image displayed in the image block 53 makes a leftward movement, and accordingly the user's desired menu is selected by checking up the screen color of the pattern region 54.

FIG. 6 shows a different composition from FIG. 5, with regard to the image and menus being displayed on the monitor screen of the system 62. An image block 63 which is similar to the image block 53 is positioned at a corner portion of the screen, and a pointer 64 is displayed on the rest of the initial screen.

When the user moves his hand, the user's image is displayed inside the image block 63 and the system causes the pointer 64 to move in response to the user's hand movement. Here, the pointer serves as a mouse pointer mainly employed in the window's operating system in a computer.

The method of menu selection and activation using image cognition according to the preferred embodiments of the present invention may also replace the mouse-oriented menu selection and activation in prevalent window system computers.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

[1. An application menu selecting and activating method using image cognition, comprising the steps of:

recognizing a pattern position on a screen using a pattern cognition function executed per predetermined time period;

selecting a menu when the recognized pattern position is within a certain pattern region on the screen, the pattern region containing the menu; and activating the selected menu.]

[2. The application menu selecting and activating method of claim 1, wherein a user's image is displayed on a client's region prior to the recognizing of the pattern position.]

[3. The application menu selecting and activating method of claim 2, wherein the user's image is displayed on a predetermined position in the client's region.]

[4. The application menu selecting and activating method of claim 1, wherein the pattern is a user's hand.]

[5. The application menu selecting and activating method of claim 1, wherein the pattern is a ring wearable by the user.]

[6. The application menu selecting and activating method of claim 1, wherein the pattern is an indication rod.]

[7. The application menu selecting and activating method of claim 6, wherein the indication rod comprises:

a body grabbable by the user;

a first pattern portion formed on a side end of the body;

a second pattern portion disposed at an outer end of the first pattern portion and guidable through the first pattern portion; and a button for guiding the second pattern portion into and out of the first pattern portion.]

[8. The application menu selecting and activating method of claim 1, wherein the pattern is an indication rod having two different patterns.]

[9. The application menu selecting and activating method of claim 1 or 7, wherein the recognizing of the pattern position is performed on the ground of one of the two different patterns, and the activating of the menu is performed on the ground of the other of the two different patterns.]

[10. The application menu selecting and activating method of claim 1, wherein the selecting of the menu is performed when a background color of the pattern is converted in accordance with conversion of a user's pattern position.]

[11. The application menu selecting and activating method of claim 1, wherein the activating of the menu is performed when a user's particular body motion is executed.]

[12. The application menu selecting and activating method of claim 1, wherein the activating of the menu is performed after a particular pattern is positioned within the predetermined pattern region for a predetermined time period.]

[13. An application menu selecting and activating method using image cognition, comprising the steps of:

determining a pattern position on a screen by scanning a predetermined pattern region on the screen;

selecting a menu in the pattern region in which the pattern is positioned; and activating the selected menu.]

[14. The application menu selecting and activating method of claim 13, wherein the pattern is a user's hand.]

[15. The application menu selecting and activating method of claim 13, wherein the pattern is a ring wearable by the user.]

16. [The] *An* application menu selecting and activating method [of claim 13], *comprising:*

*determining whether a pattern on a screen is positioned in a predetermined pattern region by scanning the predetermined pattern region on the screen;*

*selecting a menu in the pattern region in which the pattern is positioned; and*

*activating the selected menu,* wherein the pattern is an indication rod*, the indication rod including a first pattern portion and a second pattern portion, the first pattern portion being used in the selecting of the menu, the second pattern portion being used in the activating of the selected menu.*

[17. The application menu selecting and activating method of claim 13, wherein the pattern is an indication rod having two different patterns.]

[18. The application menu selecting and activating method of claim 13 or 17, wherein the recognizing of the pattern position is performed on the ground of one of the two different patterns, and the activating of the menu is performed on the ground of the other of the two different patterns.]

[19. An application menu selecting and activating apparatus using image cognition, comprising:

a camera for capturing an image; and display means for displaying the image received from the camera on a screen, for designating particular regions of the screen for displaying respectively a plurality of predetermined menus, and for selecting a menu from the plurality of predetermined menus when a pattern is positioned on its corresponding region.]

[20. An application menu selecting and activating method using image cognition, comprising the steps of:

recognizing a user's image in real time;

displaying the user's image on a client region of a display screen;

recognizing a pattern position by a pattern cognition per predetermined time period;

selecting a menu when the recognized pattern position is within a certain pattern region containing predetermined menus; and activating the selected menu.]

21. An application menu selecting and activating method using image cognition, comprising [the steps of]:

displaying [the] *a* user's image on a client region of a display screen*, the user's image being displayed on a first area of the display screen;*

*displaying a menu image on pattern regions of the display screen, the menu image being displayed on a second area of the display screen, wherein the first area and the second area are separately positioned on the display screen*;

determining *whether* a pattern [position] on a screen *is positioned in a predetermined pattern region* by scanning [a] *the* predetermined pattern region;

selecting a menu in the pattern region in which the pattern is positioned; and activating the selected menu*, wherein the pattern is displayed and moved on the second area of the display screen, the pattern being moved between the pattern regions in response to a user's gesture displayed on the first area of the display screen*.

[22. An application menu selecting and activating apparatus using image cognition, comprising:

a camera for capturing a user's image in real time;

display means for displaying the user's image received from the camera on a client region and for designating a particular region of the externally applied image;

means for selecting a required menu when a pattern is positioned on a corresponding region; and a means for activating the selected menu.]

*23. The method of claim 21, wherein the activating is performed by recognizing the user's gesture.*

*24. The method of claim 23, wherein the recognizing the user's gesture is performed by comparing a previously captured user image with a currently captured user image.*

*25. The method of claim 21, wherein the activating is performed by determining a predetermined stationed time lapse.*

* * * * *